3,299,037
NOVEL POLYPEPTIDES AND INTERMEDIATES
FOR THE PREPARATION THEREFOR
Roger Boissonnas, Bottmingen, and Stephan Guttmann, Basel, Switzerland, assignors to Sandoz Ltd. (also known as Sandoz A.G.), Basel, Switzerland
No Drawing. Filed Apr. 28, 1964, Ser. No. 363,285
Claims priority, application Switzerland, May 2, 1963, 5,514/63
7 Claims. (Cl. 260—112.5)

The present invention relates to a hitherto unknown polypeptide and its salts:

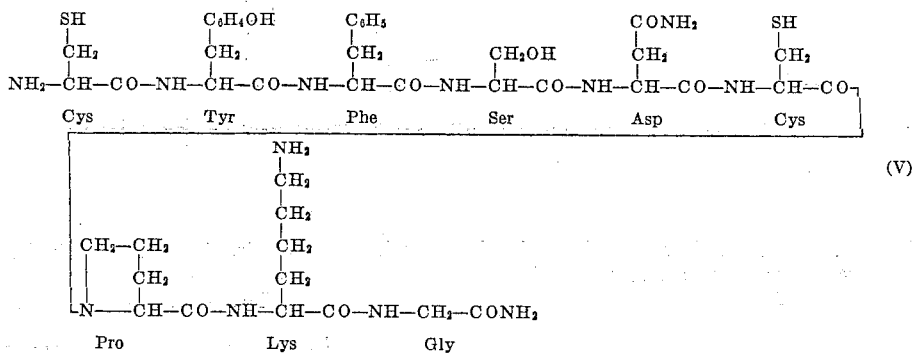

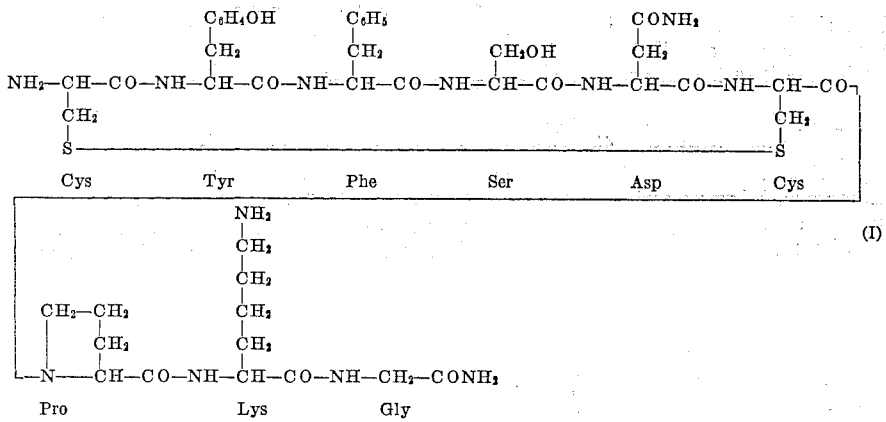

The polypeptide I may be obtained by methods for the synthesis of peptides in actual use or described in the literature on the subject, it being possible to join together the amino acids in the order indicated in the above formula one at a time or by first forming constituent peptide units and joining these together until the polypeptide V (see below) results and oxidising Compound V to form Compound I.

One method of producing Compound I and its acid addition salts comprises converting the nonapeptide of Formula V, to the Compound I by oxidising Compound V in aqueous solution at a pH value of from about 4 to about 9 and, when it is desired to produce an acid addition salt, reacting the resulting Compound I with an organic or inorganic acid; the acid addition salts are formed by methods known per se. The oxidation may be effected with oxygen, air or an aqueous hydrogen peroxide or potassium ferricyanide solution.

Compound V may be obtained by converting a Compound IV

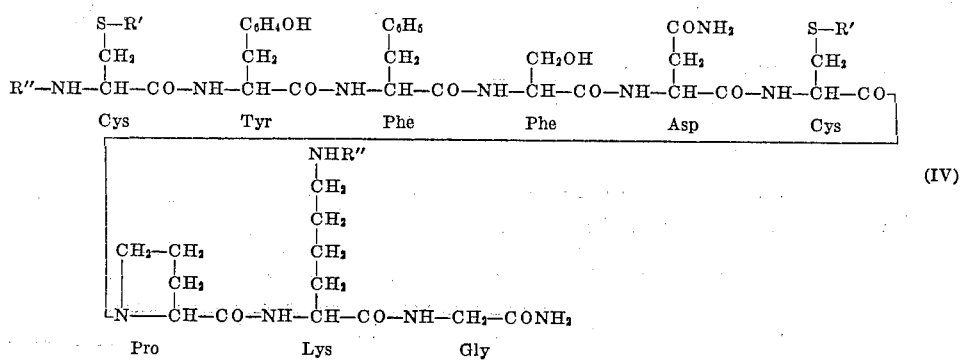

in which:

R' denotes a radical capable of protecting a sulfhydryl radical in peptide synthesis, and R" denotes a radical capable of protecting an amino radical in peptide synthesis, by reduction with an alkali metal (e.g. sodium or potassium) in liquid ammonia.

Compound IV may be obtained by condensing a compound of Formula II

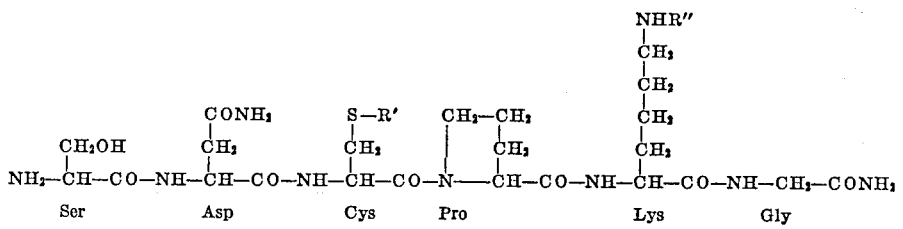

in which R' and R" have the above significance, with a reactive derivative of a free acid, said free acid having the Formula III

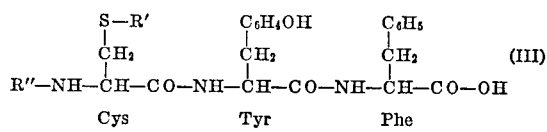

in which R' and R" have the above significance.

Examples of radicals for protecting the amino radical in the above process by temporarily blocking it are the carbobenzoxy, carbo-p-chloro-benzyloxy, p-toluene-sulphonyl or triphenylmethyl radicals, while examples of radicals for protecting the sulfhydryl radical are phenyl, benzyl, p-bromo-benzyl and p-xylyl radicals.

It has now been found that Compound I has an antidiuretic effect almost equal to that of natural lysine vasopressin (vasopressin from pigs, Formula VI)

especially useful in the treatment of diabetes insipidus. The selective antidiuretic effect of Compound I could not be foreseen as it is known that the replacement of a glutamine radical with a serine radical in compounds of the oxytocin series almost completely suppresses their inherent antidiuretic action.

Examples of acids suitable for acid salt formation with Compound I are as follows: hydrochloric, hydrobromic, sulphuric, citric, tartaric, succinic, maleic, malic, acetic, benzoic, hexahydrobenzoic, methanesulphonic, fumaric, gallic, and hydriodic acid.

The process of the invention may be carried out, for example, as follows:

N-triphenylmethyl-L-serine is condensed with L-asparaginyl - S - benzyl - L - cystinyl - L - prolyl - N - ε-p-toluenesulphonyl-L-lysyl-glycinamide to give N-triphenylmethyl - L - seryl - L - asparaginyl - S - benzyl - L-cysteinyl - L - proyl - N - ε - p - toluenesulphonyl - L-lysyl-glycinamide. After splitting off the triphenyl radical, the resulting L - seryl - L - asparaginyl-S-benzyl-L-cysteinyl - L - prolyl - N - ε - p - toluenesulphonyl - L-lysyl-glycinamide is condensed with N-carbobenzoxy-S-benzyl - L - cysteinyl - L - tyrosyl - L - phenylalanine - p-nitro-phenyl ester to give N-carbobenzoxy-S-benzyl-L-cysteinyl - L - tyrosyl - L - phenylalanyl - L - seryl - L-asparaginyl - S - benzyl - L - cysteinyl - L - propyl - N-ε-p-toluenesulphonyl-L - lysyl - glycinamide. This nonapeptide derivative is treated with an alkali metal, preferably sodium or potassium, in liquid ammonia so that the linear nonapeptide V results. This is converted by oxidation in aqueous solution at a pH value of from about 4 to about 9, preferably with air, oxygen, hydrogen peroxide or potassium ferricyanide, to the biologically active, cyclic polypeptide I.

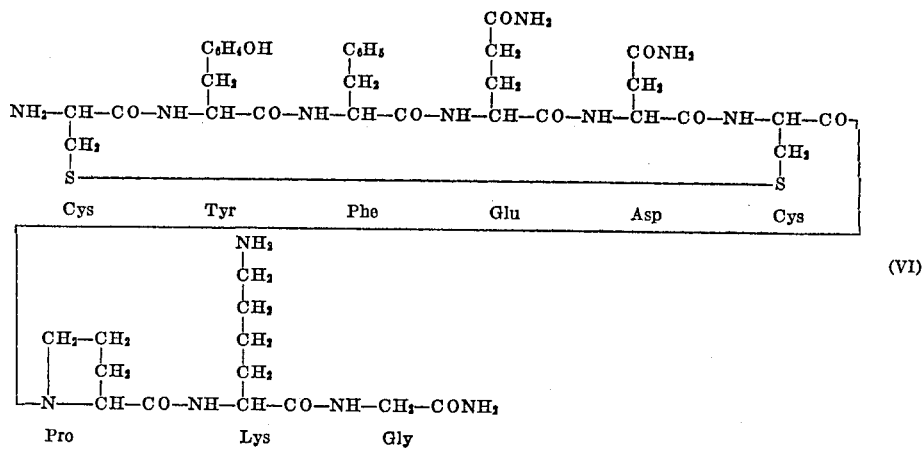

from which the new compound differs in that it contains a serine radical in the place of the glutamine radical. However, as opposed to the natural vasopressins, Compound I has no vasoconstrictive action and is thus suggested for use in therapy as a substance having a specific antidiuretic effect. The properties of Compound I are The hitherto unknown polypeptide I may be used as free base or as a salt with an organic or inorganic acid, either as pharmaceutical on its own or in the form of appropriate medicinal preparations for administration e.g. parenterally, enterally or instanasally. In order to produce such medicinal preparations, the compounds of the invention are worked up with organic or inorganic adjuvants which are inert and physiologically acceptable. Examples of such adjuvants are as follows:

Tablets and dragees—Lactose, starch, talc and stearic acid.
Syrups—Solutions of cane sugar, invert sugar and glucose.
Injectable solutions—Water, alcohols, glycerin and vegetable oils.
Suppositories—Natural or hardened oils and waxes.

The preparations may furthermore contain suitable preserving, stabilizing or wetting agents, solubilizers, sweetening and colouring substances or flavourings.

The present invention also includes pharmaceutical compositions containing, in addition to a physiologically acceptable carrier, the compound I and/or an acid addition salt thereof.

It should be noted that Compound V above, together with its acid addition salts, and Compounds II above, and also the free hexapeptide II and its acid addition salts wherein R' and R'' each represent a hydrogen atom, are included in the present invention as well as Compounds IV above.

In the following examples all temperatures are indicated in degrees centigrade.

EXAMPLE 1

(a) *N - triphenylmethyl - L - seryl - L - asparaginyl - S - benzyl - L - cysteinyl - L - prolyl - N - ε - p - toluenesulphonyl-L-lysyl-glycinamide*

20.5 g. of N-triphenylmethyl-L-serine, 60 g. of L-asparaginyl - S - benzyl - L - cysteinyl - L - prolyl - N-ε-p-toluenesulphonyl-L-lysyl-glycinamide and 13.4 of dicyclohexyl carbodiimide are dissolved in 300 cc. of dimethylformamide at $-10°$ and the solution is left to stand for 12 hours at 20°. Evaporation to dryness is effected in a vacuum, diethyl ether is added to the residue, the resulting precipitate is washed with diethyl ether and dried in a vacuum at 30°. 58 g. of N-triphenylmethyl - L - seryl - L - asparaginyl - S - benzyl - L - cysteinyl - L - prolyl - N - ε - p - toluenesulphonyl - L - lysyl-glycinamide are obtained. Melting point 130°; $[\alpha]^{21}_D = -25°$ (dimethylformamide).

(b) *N - carbonbenzoxy - S - benzyl - L - cysteinyl - L - tyrosyl - L - phenylalanyl - L - aspaginyl - S - benzyl - L - cysteinyl - L - prolyl - N - ε - p - toluenesulphonyl-L-lysyl-glycinamide.*

50 g. of N-triphenylmethyl-L-seryl-L-asparaginyl-S-benzyl - L - cysteinyl - L - prolyl - N - ε - p - toluenesulphonyl-L-lysyl-glycinamide are dissolved in 250 cc. of anhydrous trifluoroacetic acid and the solution is left to stand for one hour at 20°. After evaporating the solvent in a vacuum at a temperature below 40°, the residue is carefully washed with diethyl ether and a solution of 31.5 g. of N-carbobenzoxy-S-benzyl-L-cysteinyl-L-tyrosyl-L-phenylalanine-p-nitro-phenyl ester and 7.5 cc. of triethylamine in 250 cc. of dimethylformamide is added thereto. The mixture is left to stand for 2 days at 20°, 1000 cc. of ethyl acetate are subsequently added and the precipitate is washed with ethyl acetate. After drying in a vacuum at 30°, 38 g. of N-carbobenzoxy-S-benzyl - L - cysteinyl - L - tyrosyl - L - phenylalanyl - L - seryl - L - asparaginyl - S - benzyl - L - cysteinyl - L - prolyl-N-ε-p-toluenesulphonyl-L-lysyl-glycinamide are obtained. Melting point 208°; $[\alpha]^{21}_D = 55°$ (dimethylformamide).

(c) *L-cysteinyl - L - tyrosyl - L - phenylalanyl - L - seryl-L-asparaginyl - L - cysteinyl - L - prolyl - L - lysyl-glycinamide.*

The necessary amount of sodium or potassium metal is added to a solution of 5 g. of N-carbobenzoxy-S-benzyl - L - cysteinyl - L - tyrosyl - L - phenylalanyl - L - seryl - L - asparaginyl - S - benzyl - L - cysteinyl - L - prolyl - N - ε - p - toluenesulphonyl - L - lysyl - glycinamide in 1200 cc. of dry liquid ammonia, whilst stirring at the boiling temperature of the solution, to give a permanent blue colouration. After the addition of 3 g. of ammonium chloride, the solution is evaporated to dryness. The residue contains L-cysteinyl-L-tyrosyl-L-phenylalanyl - L - seryl - L - asparaginyl - L - cysteinyl-L-prolyl-L-lysyl-glycinamide.

(d) *Polypeptide I.*

The residue obtained from step (c) above is dissolved in 5 litres of 0.01 N acetic acid and oxidized at a pH value of 6.5–8.0 by introducing air or oxygen for one hour at 0–30°. The solution is brought to a pH value of 4.0–5.0 and after the addition of 50 g. of sodium chloride or 0.64 g. of methanesulphonic acid or of 0.76 g. trifluoroacetic acid, evaporation to dryness is effected, whereby a dry powder results which keeps well, it may be stored and when used it may be dissolved to give a clear solution. However, the solution may also be used as such, if desired after diluting with water or a salt solution.

For the purpose of removing the inorganic salts, the above mentioned powder, which results after the addition of trifluoroacetic acid, is subjected to a countercurrent distribution in the system secondary butanol/water/trifluoroacetic acid 120/160/1. After 552 transfer stages the compound is present in tubes 180–210 having a maximum in tube 192 (K=0.55). After evaporation the active polypeptide is obtained in good yield in the form of its hygroscopic trifluoroacetate, which has been found to be uniform both chromatographically and electrophoretically. Migration in the case of paper electrophoresis at a pH value of 5.8 and 40 V/cm.: 39 mm in 60 min. (the histidine used as the standard migrates 59 mm). Migration in the case of the paper electrophores is at a pH value of 1.9 and 40 V/cm.: 110 mm. (the tryptophan used as the standard migrates 110 mm). $R_f$ value in the case of paper chromatography in the system isoamyl alcohol/pyridine/water: 0.77. The total hydrolysis (16 hours, 110°, HCl 6 N) yields the following amino acids in equimolar quantities: cystine, serine, asparagine, proline, lysine, tyrosine, phenylalanine, glycine. The product has the following biological activities: 70 IU/mg. on the inhibition of diuresis of the rat and only 3 IU/mg. on the blood pressure of the rat and 1 IU/mg. on the uterus of the rat.

EXAMPLE 2

The same procedure as in Example 1 is used, except that final oxidation is effected at 0–30° by the addition of 7.5 cc. of a N solution of hydrogen peroxide in water at a pH value of 4.0–6.0 (instead of oxidation by introducing air or oxygen).

EXAMPLE 3

The same procedure as in example 1 is used, except that the final oxidation is effected at 0–30° by adding 6.7 cc. of an aqueous 1 N solution of potassium ferricyanide at a pH value of 5.5–7.5.

What we claim is:

1. A compound selected from the group consisting of a polypeptide of the formula

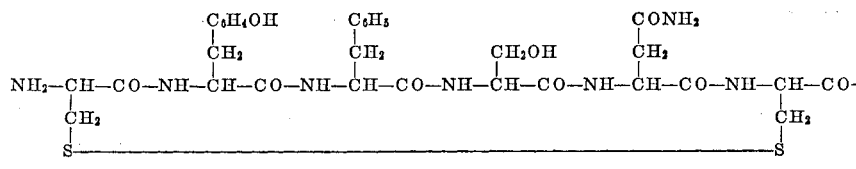

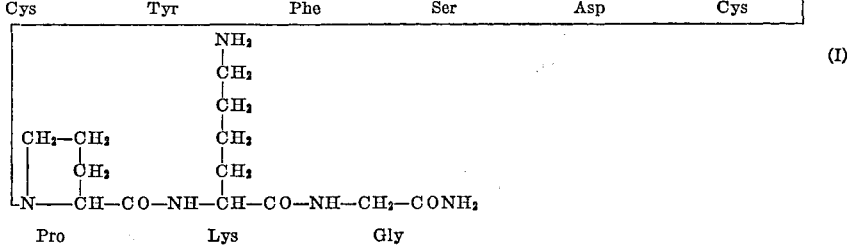

and its pharamaceutically acceptable acid addition salts.

2. A compound selected from the group consisting of a polypeptide of the formula

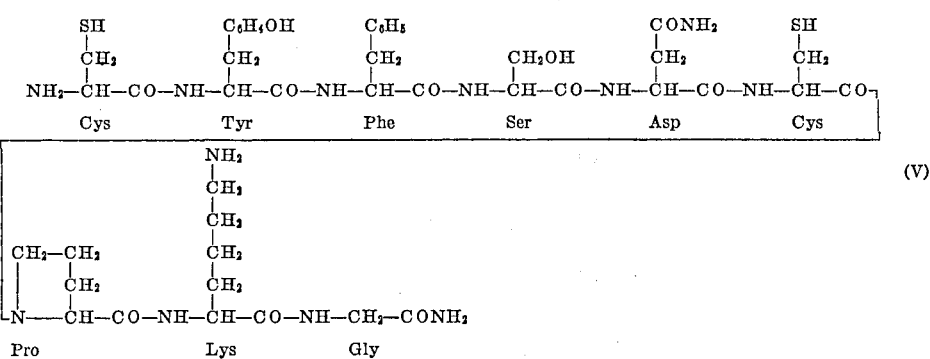

and its pharamaceutically acceptable acid addition salts.

3. A polypeptide of the formula

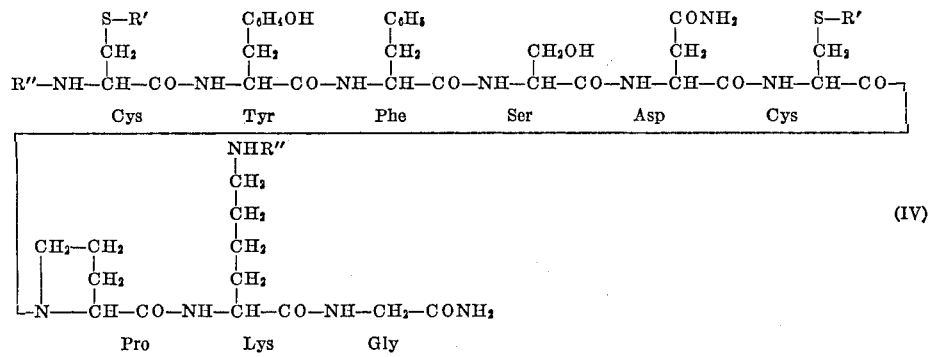

wherein R' denotes a radical capable of protecting a sulfhydryl radical in peptide synthesis and R" denotes a radical capable of protecting an amino radical in peptide synthesis.

4. A polypeptide of the formula

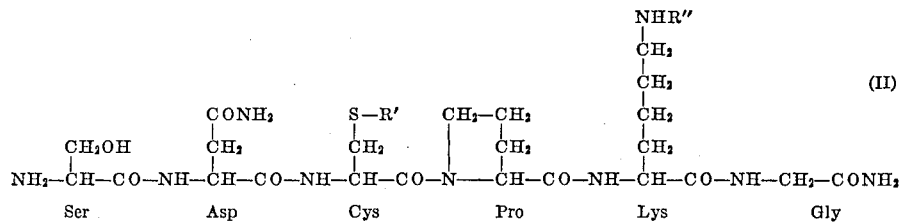

wherein R' denotes a radical capable of protecting a sulfhydryl radical in peptide synthesis and R" denotes a radical capable of protecting an amino radical in peptide synthesis.

5. L-seryl-L-aspara-ginyl-L-cysteinyl-L-prolyl-L-lysyl-glycinamide.

6. The compound N-triphenylmethyl-L-seryl-L-asparaginyl-S-benzyl-L-cysteinyl-L-prolyl-N-ε-p-toluene-sulphonyl-L-lysyl-glycinamide.

7. The compound N-carbobenzoxy-S-benzyl-L-cysteinyl-L-tyrosyl-L-phenylalanyl-L-seryl-L-asparaginyl-S-benzyl-L-cysteinyl-L-prolyl-N-ε-p-toluenesulphonyl-L-lysyl-glycinamide.

References Cited by the Examiner
UNITED STATES PATENTS 2,854,443  9/1958  Boissonnas et al. __ 260—112.5

LEWIS GOTTS, *Primary Examiner.*

P. A. STITH, *Assistant Examiner.*